United States Patent [19]
Davis

[11] 3,900,332
[45] Aug. 19, 1975

[54] LIGHTWEIGHT CEMENT COMPOSITIONS FOR BUILDING AND OTHER PURPOSES

[76] Inventor: Matthew L. Davis, 8399 Hough Ave., Cleveland, Ohio 44103

[22] Filed: Aug. 6, 1973

[21] Appl. No.: 385,731

[52] U.S. Cl.................................... 106/97; 106/94
[51] Int. Cl.............................................. C04b 7/02
[58] Field of Search.................. 106/94, 97, 96

[56] References Cited
UNITED STATES PATENTS

| | | | |
|---|---|---|---|
| 476,542 | 6/1892 | Kleb........................................ | 106/97 |
| 1,409,091 | 3/1922 | Goddard................................ | 106/97 |
| 2,727,827 | 12/1955 | Chertkof................................ | 106/97 |
| 2,776,914 | 1/1957 | Faulwetter............................. | 106/94 |
| 3,477,979 | 11/1969 | Hillyer.................................... | 106/94 |
| 3,503,767 | 3/1970 | Gaines et al.......................... | 106/97 |
| 3,713,856 | 1/1973 | McConnaughay..................... | 106/97 |
| R26,597 | 6/1969 | Small et al............................. | 106/97 |

FOREIGN PATENTS OR APPLICATIONS

| | | | |
|---|---|---|---|
| 142,958 | 5/1920 | United Kingdom.................... | 106/97 |

OTHER PUBLICATIONS

Lea & Desch, *The Chemistry of Cement & Concrete*, London, Edw. Arnold Publishers, 1956, pp. 499–500.

*Primary Examiner*—Delbert E. Gantz
*Assistant Examiner*—James W. Hellwege
*Attorney, Agent, or Firm*—William Isler

[57] ABSTRACT

Compositions are described for use in making a concrete-like product of light weight and improved strength. The compositions consist essentially of crushed coke and portland cement, to which a small amount of lime may be added as a coloring agent or whitener. A preferred form of the composition involves treatment of the crushed coke with a waterproofing solution containing a resin. The compositions are especially adapted for uses such as making walls, floors, roofing, window seals, steps, porches, etc.

6 Claims, No Drawings

LIGHTWEIGHT CEMENT COMPOSITIONS FOR BUILDING AND OTHER PURPOSES

Concrete is a hard strong building material made by mixing a cementing material, commonly portland cement, and a mineral aggregate, such as washed sand and gravel or broken rock, with sufficient water to cause the cement to set and bind the aggregate. It is used largely in the construction of bridges, buildings, dams, pavements, tunnels, and smaller products.

The aggregates, such as sand and gravel or broken rock, which constitute a substantial proportion of the mixture, are relatively heavy, so that in most cases, the weight of the concrete is disproportionate to or in excess of the strength desired or required in the concrete.

The present invention has, as its primary object, the provisions of a concrete which is relatively light in weight, but has high strength in relation to its weight, so as to adapt it for many uses, such as walls, floors, roofing, window seals, steps, porches, and other uses where lightweight concrete is presently being used.

Another object of the invention is to provide a concrete which has strength and other physical properties which are superior to those of other lightweight concretes or concrete aggregates presently on the market, such, for example, as Perlite and Haydite.

This decrease in weight and increase in strength and other physical properties, is achieved primarily by using, in the mixture, in place of the aggregates sand, gravel, or broken rock, a lightweight material, namely, crushed coke.

The coke used in the mixture is crushed to a size ranging from powder to a particle size whose largest dimension is about one-half inch.

The crushed coke is mixed with portland cement, and sufficient water is added to the mixture to cause the cement to set and bind the coke particles together. The weight and strength of the final product increases proportionately to increase in size of the coke particles.

If desired, a small amount of lime may be added to the mixture to lighten the color of the final product.

The mixture consists of the following ingredients, in the proportions by weight indicated.

|  | Range | Preferred |
| --- | --- | --- |
| Coke | 45.60 – 68.40% | 57.0% |
| Portland Cement | 30.00 – 45.00% | 37.5% |
| Lime | 0 – 6.6% | 5.5% |
|  | 100% | 100.0% |

In making a concrete in accordance with the preferred or optimum formula, approximately two gallons of water are added to 100 parts by weight of the mixture consisting of 57% coke, 37.5% cement, and 5.5% of lime, and this mixture is mixed in a concrete mixer until the mass is ready to be poured.

The aforesaid mixture is not waterproof, in the sense that the coke particles are not waterproofed.

In order to provide a composition in which the coke particles are waterproofed, so that concrete made from the composition is waterproof, a mixture is utilized consisting of the following ingredients in the proportions by weight indicated:

|  | Range | Preferred |
| --- | --- | --- |
| Coke | 44.14 – 67.63% | 56.36% |
| Portland Cement | 29.78 – 44.68% | 37.23% |
| Lime | 0 – 6.38% | 5.32% |
| Thermosetting Resin | .87 – 1.31% | 1.09% |
|  | 100% | 100% |

In preparing the aforesaid mixture, the coke is first immersed in a bath of a thermosetting resin, which has been diluted with a small amount of benzene to render it more flowable. The resin is preferably a polyester resin or a phenol formaldehyde resin, although other types of thermosetting resins may be employed.

After the coke has been thus treated, the excess resin is permitted to drain off, and the coke dried, so that the coke particles are rendered waterproof by the resin which coats the particles. In practice, the weight of the coke particles, following such treatment, is increased only slightly by the addition of the resin, that is to say, the weight is increased about 2%.

Following such treatment, the resin-coated coke is mixed with the portland cement and lime to form a dry composition, the formula of which is within the above described ranges.

In making a concrete, utilizing the aforesaid preferred or optimum formula, approximately two gallons of water are added to 100 parts by weight of the mixture consisting of 56.36% coke, 37.23% portland cement, 5.32% lime, and 1.09% resin.

As an example of such a dry mixture, 53 pounds of coke are treated with a solution consisting of two gallons of benzene and one pound of resin, thereby producing coke, the weight of which has been increased about 1 pound by the addition of the resin coating, that is to say, the weight of the coated coke is about 54 pounds, all of the benzene having evaporated as a result of the drying action.

The 54 pounds of coated coke is then thoroughly mixed with 35 pounds of portland cement, and 5 pounds of lime, forming a dry mixture weighing a total of 94 pounds, which is bagged.

In order to form a concrete mix, there is added to the 94 pounds of dry mix, approximately two gallons of water which is thoroughly mixed with the dry mixture, and then poured.

In some cases, as where concrete, in ready-mixed form, is to be delivered from a concrete plant to the site at which the concrete is to be poured, and in which the delivery vehicle or truck is equipped with a rotating mixer into which the concrete-making ingredients are placed, the following ingredients, in the proportion by weight indicated, were placed in the rotating mixer:

|  | Range | Preferred |
| --- | --- | --- |
| Coke | 38.90 – 58.34% | 48.62% |
| Portland Cement | 25.68 – 38.52% | 32.10% |
| Lime | 0 – 5.52% | 4.60% |
| Thermosetting Resin | 5.87 – 8.81% | 7.34% |
| Water | 5.87 – 8.81% | 7.34% |
|  | 100% | 100% |

In the course of thus preparing the ready-mixed concrete, coke, which has not been coated with the resin, is used, but in the course of the mixing, the coke particles become coated with the resin.

Compression tests were performed on cylinders prepared from the ready-mixed concrete made in accordance with the aforesaid preferred formula, consisting of 48.62% coke, 32.10% portland cement, 4.60% lime, 7.34% thermosetting resin, and 7.34% water.

These tests were made in accordance with ASTM-C 39 (CSA A 23. 2-13) conducted by Gulick-Henderson Testing Laboratories, 15411 Chatfield Avenue, Cleveland, Ohio.

For this purpose, the cylinders were 5¾ inches in diameter and 12 inches in height or length. These cylinders were tested on a Forney 12 inch Cylinder Press, Serial LT-500-5546.

The results of the tests were as follows:

| CYLINDER MARK | WEIGHT OF CYLINDER | CYLINDER PRESS LOAD AT BREAKING POINT OF CYLINDER | UNIT LOAD (lbs./psi) AT BREAKING POINT OF CYLINDER | DATE OF TESTING | AGE AT TEST DATE |
|---|---|---|---|---|---|
| CB-1 | 18.10 | 41,000 | 1450 | 3-29-73 | 7 days |
| CB-2 | 19.00 | 44,000 | 1555 | 3-29-73 | 7 days |
| CB-3 | 18.75 | 79,000 | 2795 | 4-19-73 | 28 days |
| CB-4 | 18.85 | 89,000 | 3150 | 4-19-73 | 28 days |
| CB-5 | 18.92 | 82,000 | 2900 | 4-19-73 | 28 days |

It is thus seen that I have provided a concrete which is relatively light in weight, but has high strength in relation to its weight; and which has strength and other physical properties which are superior to those of other lightweight concretes or concrete aggregates presently on the market.

Having thus described my invention, I claim:

1. A mixture for use in making waterproof concrete, said mixture consisting of from 44.14 to 67.63% by weight of crushed coke coated with a thermosetting resin in an amount constituting an additional 0.87 to 1.31% of the mixture, 29.78% to 44.68% portland cement, and not in excess of 6.38% lime.

2. A mixture, as defined in claim 1, wherein the thermosetting resin is selected from the group consisting of polyester resins and phenol formaldehyde resins.

3. A mixture as defined in claim 1 wherein the mixture consists of about 56.36% by weight of crushed coke coated with a thermosetting resin in an amount constituting an additional 1.09% of the mixture, about 37.23% portland cement, and about 5.32% lime.

4. A mixture as defined in claim 1 wherein the coke is of a size ranging from powder to a particle size whose largest dimension is about one-half inch.

5. A concrete mix for use in making waterproof concrete structures, said mix consisting of about 38.90 to 58.34% by weight of crushed coke, 25.68 to 38.52% portland cement, 0 to 5.52% lime, 5.87 to 8.81% of a thermosetting resin, and 5.87 to 8.81% water.

6. A mixture as defined in claim 5 wherein said mixture consists of about 48.62% by weight of crushed coke, about 32.10% portland cement, about 4.60% lime, about 7.34% thermosetting resin, and about 7.34% water.

* * * * *